United States Patent
Oyashiki et al.

[11] Patent Number: 5,808,670
[45] Date of Patent: Sep. 15, 1998

[54] METHOD AND SYSTEM FOR CAMERA CONTROL WITH MONITORING AREA VIEW

[75] Inventors: Masahiko Oyashiki; Ryosuke Nishiguchi; Hidenori Kawamura, all of Tokyo, Japan

[73] Assignee: NEC System Integration & Construction, Ltd., Tokyo, Japan

[21] Appl. No.: 524,277

[22] Filed: Sep. 6, 1995

[30] Foreign Application Priority Data

Feb. 17, 1995 [JP] Japan ................................. 7-053227

[51] Int. Cl.$^6$ ................................. H04N 7/18; H04N 9/47
[52] U.S. Cl. ................................. 348/143; 348/147
[58] Field of Search .................... 348/143–159, 348/211, 207, 369, 155, 157; H04N 7/18, 9/47

[56] References Cited

U.S. PATENT DOCUMENTS

| | | | |
|---|---|---|---|
| 4,992,866 | 2/1991 | Morgan | 348/155 |
| 5,111,288 | 5/1992 | Blackshear | 348/143 |
| 5,359,363 | 10/1994 | Kuban et al. | 348/143 |
| 5,430,511 | 7/1995 | Paff et al. | 348/143 |
| 5,517,236 | 5/1996 | Sergeant et al. | 348/143 |
| 5,523,783 | 6/1996 | Cho | 348/157 |
| 5,528,289 | 6/1996 | Cortjens | 348/211 |

FOREIGN PATENT DOCUMENTS

419411 7/1993 Japan.
2266237 9/1995 Japan.

*Primary Examiner*—Tommy P. Chin
*Assistant Examiner*—Nhon T. Diep
*Attorney, Agent, or Firm*—Joseph C. Mason, Jr.

[57] ABSTRACT

A method of and a system of camera control are shown, in which a monitoring area view 2 is displayed on a monitor screen 1a. An installation position A of a camera unit 5 is input as origin A on the monitoring area view 2 with a point input unit 4. Further, a point B indicative of the home position direction of the camera unit 5 is input from the point input unit 4. A line connecting the pick-up position A of the camera unit and home position direction B thereof are set to be a virtual line C (0°); and a monitoring point X is input on the monitoring area view with the point input unit 4 to obtain a monitoring point angle θa which is defined by the designated monitoring point X, the origin A and the virtual line C. The camera unit 5 is caused to undergo revolution by the monitoring point angle θa.

4 Claims, 7 Drawing Sheets

A ··· Picture-taking position (origin) of camera
B ··· Home position direction
C ··· Imaginary line
D ··· Present camera position
X ··· Monitor point

FIG. 1

- 1a  Monitor screen
- 2   Monitoring area view
- 2a  Monitoring area view display range
- A   Picture-taking position of camera
- B   Home position of camera
- C   Imaginary line

FIG. 2

- 1 ··· Monitor
- 3 ··· Controller
- 4 ··· Point input unit
- 5 ··· Camera unit
- 6 ··· Communication means

FIG.3

A ··· Picture-taking position (origin) of camera
B ··· Home position direction
C ··· Imaginary line
D ··· Present camera position
X ··· Monitor point

FIG.4

2b Monitoring area
2c Monitoring prohibition area
2d Building

FIG.5

2b Monitoring area
2c Monitoring prohibition
2d Building
2e Field of sight of camera

METHOD AND SYSTEM FOR CAMERA CONTROL WITH MONITORING AREA VIEW

BACKGROUND OF THE INVENTION

1. Field of the Invention

This invention relates to a system of camera control, in which picture data obtained from a television camera is displayed on the monitor screen of a CRT or the like. More particularly, the invention concerns a method and a system for camera control with monitoring area view, for monitoring facilities involving danger, such as buildings, offices, convenience stores, large scale shops, banks and other financial organizations, power plants and so forth, and also factories and like production facilities, or cameras used for television conferences, weather forecast, viewing and so forth.

2. Related Art

Heretofore, in such type of television control system, for instance, the operator gives control system to a camera support by operating control buttons or the like provided in a control unit while watching camera picture displayed on a separate display such as a CRT, thus changing the sight field direction of the camera or enlarging or contracting the camera picture size in case of a camera having a zooming function.

In the prior art control system noted above, however, since the camera picture display and the controller are disposed independently, the operator has to give eyesight alternately to the two units, the operation is rather cumbersome, requiring great time for introducing an intended foreground subject and dictating great fatigue of the operator.

Further, the button operation requires a certain degree of skill, and the operation may be done erroneously to fail in correct change of the sight field direction of the camera to the direction of introducing the intended subject or cause opposite zooming.

Further, where a plurality of camera are used, it is necessary to provide the corresponding number of controllers or provide a switching unit for switching the cameras, thus increasing the size of the overall system, increasing the installation space thereof and increasing the degree of complication of the operation. Therefore, it is difficult to greatly increase the number of cameras that are used together.

SUMMARY OF THE INVENTION

The invention has been intended in view of the above circumstances, and its object is to provide a method of a system of camera control, in which a monitoring area view of a camera unit is displayed in the vicinity of a camera picture displayed on the screen of a CRT or the like, and the camera sight field is moved to a given position by designating the position on the monitoring area view with an external input, thus allowing simple operation, requiring less eyesight movement and eliminating operation errors.

Another object of the invention is to provide a method of and a system for camera control with monitoring area view, which allow connection of a number of cameras by using a small size and easily operable system.

To attain the above objects of the invention, there is provided a method of camera control with monitoring area view comprising the steps of:

displaying a monitoring area view 2 on a monitoring screen 1a;

inputting a point on the monitoring area view 2 with a point input unit 4, the point being the installation position A of the camera unit 5 as an origin A;

inputting a point B indicative of the home position direction of the camera unit 5 with a point input unit 4;

setting a line defined by the pick-up position A of the camera unit and the home position direction B thereof to be a virtual line C (0°);

inputting the monitoring point X on the monitoring area view 2 with the point input unit 4;

obtaining a monitoring point angle θa defined by a designated monitoring point X, the origin A and the virtual Line C; and causing revolution of the camera unit 5 by the monitoring point angle θa.

establishing a monitoring prohibition area to be excluded from the image picked up by the camera unit;

limiting the monitoring point angle θa to exclude the monitoring prohibition area from the camera image;

The method of camera control further comprises the steps of:

reading out present camera picture angle data θr from the camera unit 5;

obtaining an angle θd by adding one half the camera picture angle θr to the monitoring point angle θa; and sending out the data of the monitoring point angle θa to the camera unit when the angle θd is below the angle θc of the boundary with the monitoring prohibition area while sending out an angle obtained as a result of subtraction of the one half the camera picture angle θr from the boundary angle θc as corrected monitoring point angle θa' to the camera unit when the angle θd is above the angle θc of the boundary with the monitoring prohibition area 2c.

The method of camera control with monitoring area view further comprises the steps of:

designating a next monitoring point of the camera unit;

obtaining a relative angle θe by adding the monitoring point angle θa to a next monitoring point angle θb; or obtaining a relative angle θe by subtracting the monitoring point angle θa from a next monitoring point angle θb; and sending the relative angle θe out to the camera unit.

According to the invention, there is further provided a system for camera control with monitoring area view comprising a camera unit 5 capable of being revolved vertically and horizontally according to a predetermined control signal and for converting a video input, signal into a picture signal, a monitor 1 having a monitor screen 1a for displaying the picture signal from the camera unit 4, a point input unit 4 for designating a desired point on the monitor screen 1a, and a controller 3 to be connected to the monitor 1, the camera unit 4 and the point input unit 4, wherein the controller 3 includes:

drawing display means for displaying a monitoring area view 2 on the monitor screen 1a;

input means for obtaining, from the point unit 4, a pick-up position as origin A of the camera unit 5, a point B indicative of a home position direction of the camera unit 5 and a monitoring point 4 on the monitoring area view X;

monitoring point angle calculating means for setting a Line defined by the origin A and the home position direction B to be a virtual line (0°) and obtaining a monitoring point angle θa which is defined as an angle between a line passing through the designated monitoring point and the origin, and the virtual line (0°).

Further, in the system for camera control the controller 3 includes:

picture angle data input means for reading out present camera picture angle data θr from the camera unit 5;

angle calculating means for obtaining an angle θd by adding one half the camera picture angle data θr obtained from the picture angle data input means to the monitoring point angle θa;

comparing means for comparing the angle θd obtained by the angle calculating means and the angle θc of the boundary with the monitoring prohibition area;

corrected monitoring point angle calculating means for obtaining a corrected monitoring point angle θa' by subtracting one half the camera picture angle θr from the boundary angle θc when the angle θd is above the boundary angle θc; and revolution angle data generating means for sending out the monitoring point angle θa and corrected monitoring point angle θa' as revolution angle data DA to the camera unit 5.

An area capable of being monitored by the camera unit 5 is displayed as a drawing of that place on the monitor screen 1a of the monitor 1. This display is the monitoring area view 2. A pick-up position of the camera unit 5 is designated as origin A on the monitoring area view 2 with the point input unit 4. Likewise, a point indicative of the sight field direction, i.e., home position direction, of the camera unit 5 is designated. Further, absolute position data input from the camera unit 5 at this time constitutes absolute position data of the camera home position.

The point input unit 4 is for designating a given point on the monitor screen 1a, and it can be readily constituted by a mouse, a touch panel or unit having like function as well-known means.

A portion to which it is desired to direct the sight line of the camera unit, a place desired to be monitored, is designated by point designation on the monitoring area view 2. Since the camera unit 5 is not moved, it is possible to determine the angle a from the coordinates A ($X_O$, $Y_O$) and B ($X_H$, $Y_H$) of the origin and camera home position and the coordinates X (Xx, Yx) of the monitoring point, and the angle of movement can be known from this angle θa.

It is possible to set the monitoring prohibition area 2c on the monitoring area view display area 2a on a monitoring area view 2. The monitoring prohibition area 2c is for designating a portion which is not desired to be included in the picture from the camera unit 5 for the privacy protection sake or the like. When a monitoring point is designated on the monitoring prohibition area 2c, the operation of obtaining the angle of movement is not executed.

When a monitoring point is designated in the vicinity of the boundary with the monitoring prohibition area 2c, the picture angle θr of the camera unit 5 is obtained. When the sum of the angle of the monitoring point X and the picture angle θr is present in the monitoring prohibition area 2c, it is meant that the monitoring prohibition area 2c is partly included in the camera picture.

Thus, it is possible to exclude the monitoring prohibition area 2c from the camera picture by providing the subtraction of the angle of an overlap portion of the monitoring prohibition area 2c and the camera unit 5 from the revolution angle as revolution angle correction data DE.

BRIEF DESCRIPTION OF THE DRAWINGS

The above and other objects, features and advantages of the invention will be more apparent from the detailed description of the preferred embodiment thereof when the same is read with reference to the accompanying drawings, in which.

DETAILED DESCRIPTION OF THE PREFERRED EMBODIMENTS

Figure 1:
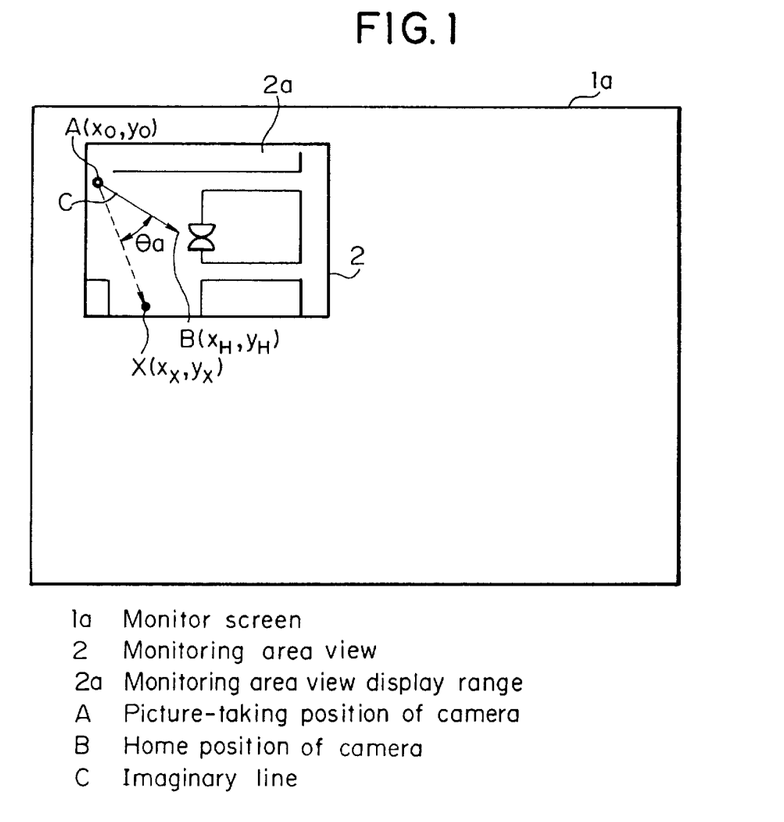
FIG. 1 is a monitor screen and a monitor area view in an embodiment of the invention.
Figure 2:
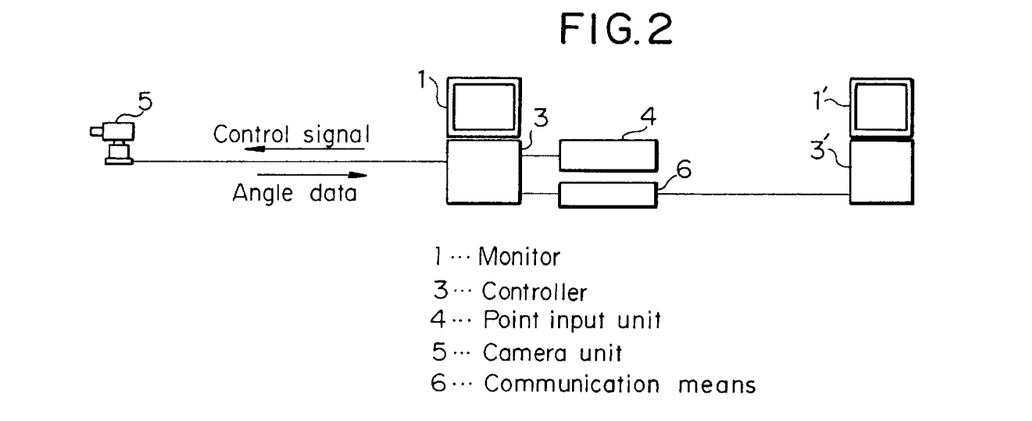
FIG. 2 is a view showing the structure of a system for carrying out the invention.

Embodiments of the invention will now be described. FIG. 1 is a view showing a monitor screen in an embodiment of the invention, and FIG. 2 is a view showing the structure of a system for carrying out the invention.

Referring to the Figures, reference numeral 5 designates a camera unit for converting a video input into a picture signal. The camera part of the unit is like the usual television camera. The camera unit 5 includes a camera and camera support integral therewith. The camera support includes a pulse motor or a servo motor, an encoder and a control circuit for controlling the motor and encoder, and it can be rotated to a prescribed extent in correspondence to prescribed pulses and digital quantity. The sight field direction of the camera can be varied freely with rotation of the pulse motor or servo motor, which has been set in the vertical and horizontal directions, according to a control signal from a controller 3.

Figure 11:
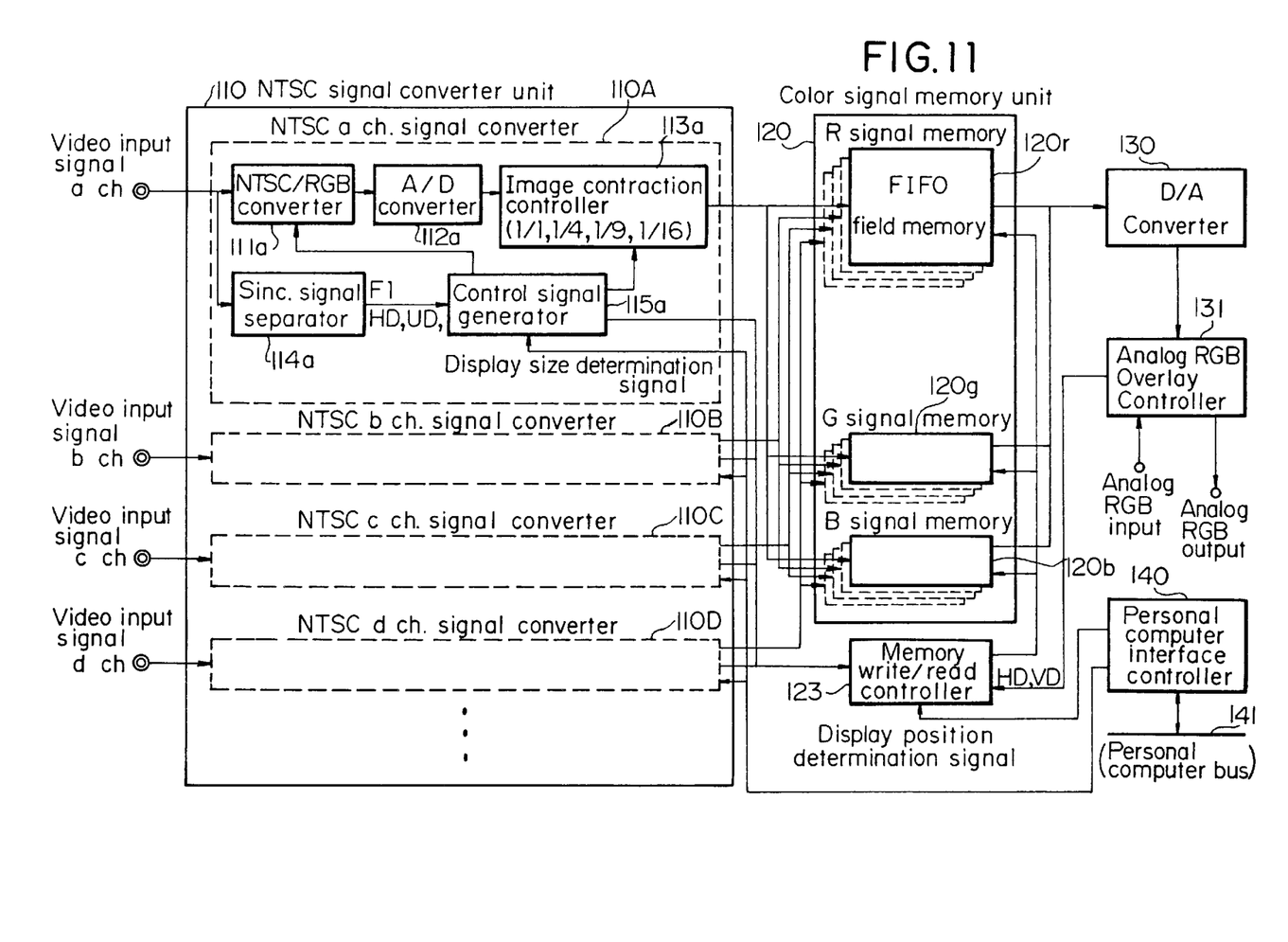
FIG. 11 is a view showing an example of overlay circuit.

The controller 3 may be a personal computer or like computer system having a data processing function. The controller 3 and the camera unit 5 are connected to each other via an Overlay circuit and a switching circuit (these circuits being not shown). The overlay circuit overlays NTSC signal supplied as picture signal from the camera unit 5 on a monitor screen 1a, and it has a structure as shown in FIG. 11, for instance.

Individual video input signals are displayed in a contracted and combined state on a screen through an NTSC signal converter unit 110, a color signal memory unit 120, a digital-to-analog converter 130 and an overlay circuit 131. The NTSC signal converter unit 110 has an NTSC/RGB converter 111a, for converting video into R, G and B signals. The R, G and B signals thus obtained are converted in an analog-to-digital converter 112a into digital signals and contracted in a contraction controller 113a into a predetermined contraction factor before being stored in R, G and B signal memories 120r, 120g and 120b of the color signal memory unit 120. Further, a synchronizing signal separator 114a separates synchronizing signal from the video input signal, the synchronizing signal thus separated being input to a control signal generator 113a to synchronize various processes. The display position, etc. of picture is controlled from the controller 3, which is a personal computer, through a personal computer interface controller 140.

The switching circuit connects the controller 3 and a plurality of camera units 5. It is thus possible to control a plurality of camera units 5 with a single controller through switching of control signals, such as picture angle data and sight field direction data.

Reference numeral 4 designates a point input unit. This unit may be of any kind so long as it permits designation of a given point on the monitor screen; for instance a mouse, a touch panel, etc. may be used. Reference numeral 6 designates communicating means for connecting the controller 3 to a different controller 3'. For example, the communicating means may be a modem line or a digital communication network. With different controller 3' and monitor 1' connected via the communication means 6, operation like the operation of the controller 3 and monitor 1 may be made even in a remote place, which is effective for television conferences, events, sight-seeing guides, etc.

The monitor 1 has a monitor screen 1a. A monitor area view 2 is displayed on the monitor screen 1a. Using, for instance, a graphic software based on a computer program, a drawing of the camera installation cite or like constitution of an area capable of being visually monitored by the camera unit, is produced in advance and displayed. Labeled A is the pick-up position of the camera unit 5, i.e., origin as the center of the camera unit 5, in the camera area view 2. This position is displayed by the symbol as shown. Labeled B is the home position indicative of the direction of the camera, i.e., the sight field direction of the camera unit 5. Labeled C is a virtual line constituted by the pick-up position of the camera unit 5 and the origin A and the home position B. Labeled D is the present camera position in such case as when the next monitoring point is designated in consequence of movement of the camera unit 5 from the origin A along the sight line. Labeled X is a monitoring point designating the camera direction.

Figure 9:
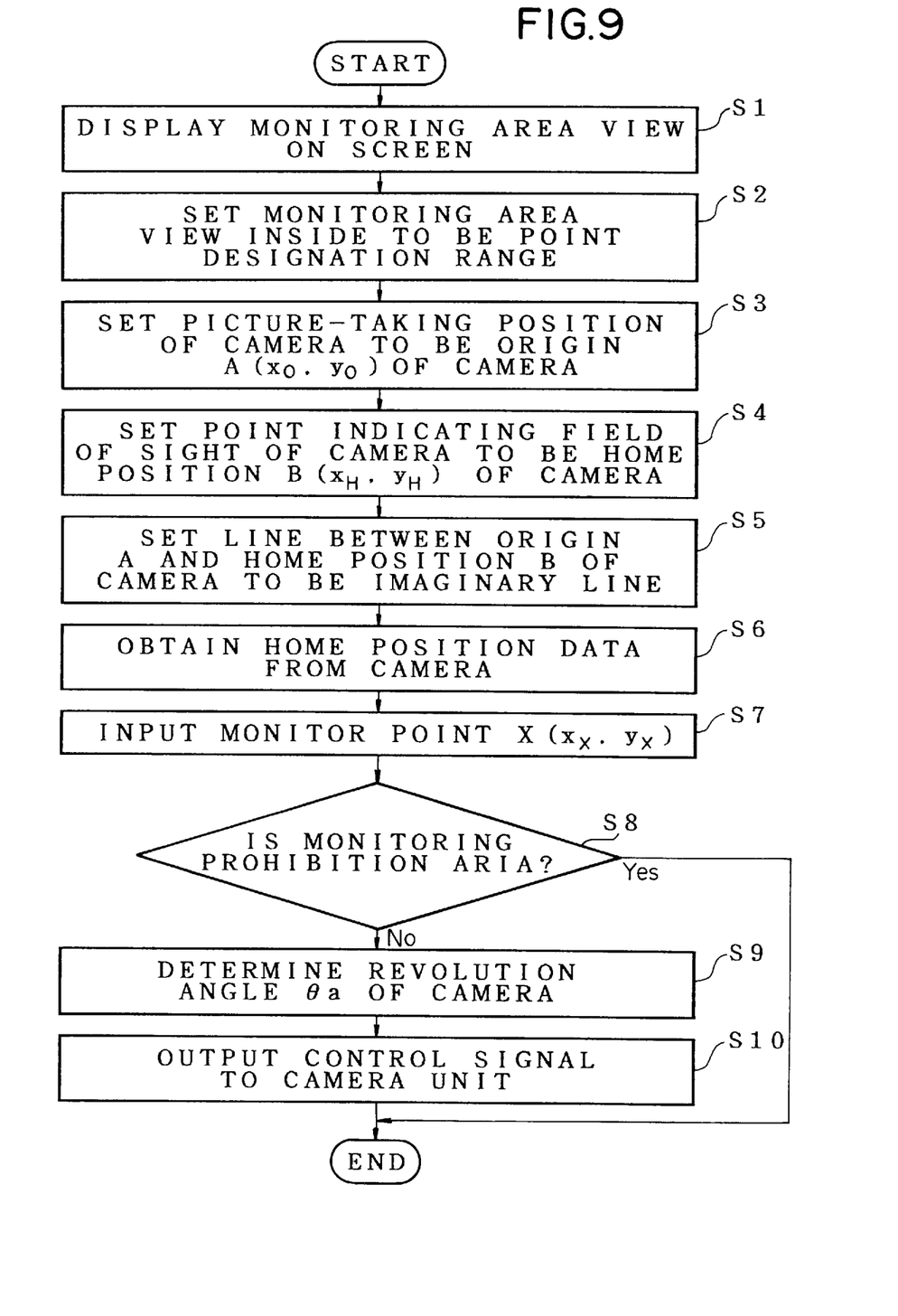
FIG. 9 is a flow chart illustrating one embodiment of the invention.
Figure 10:
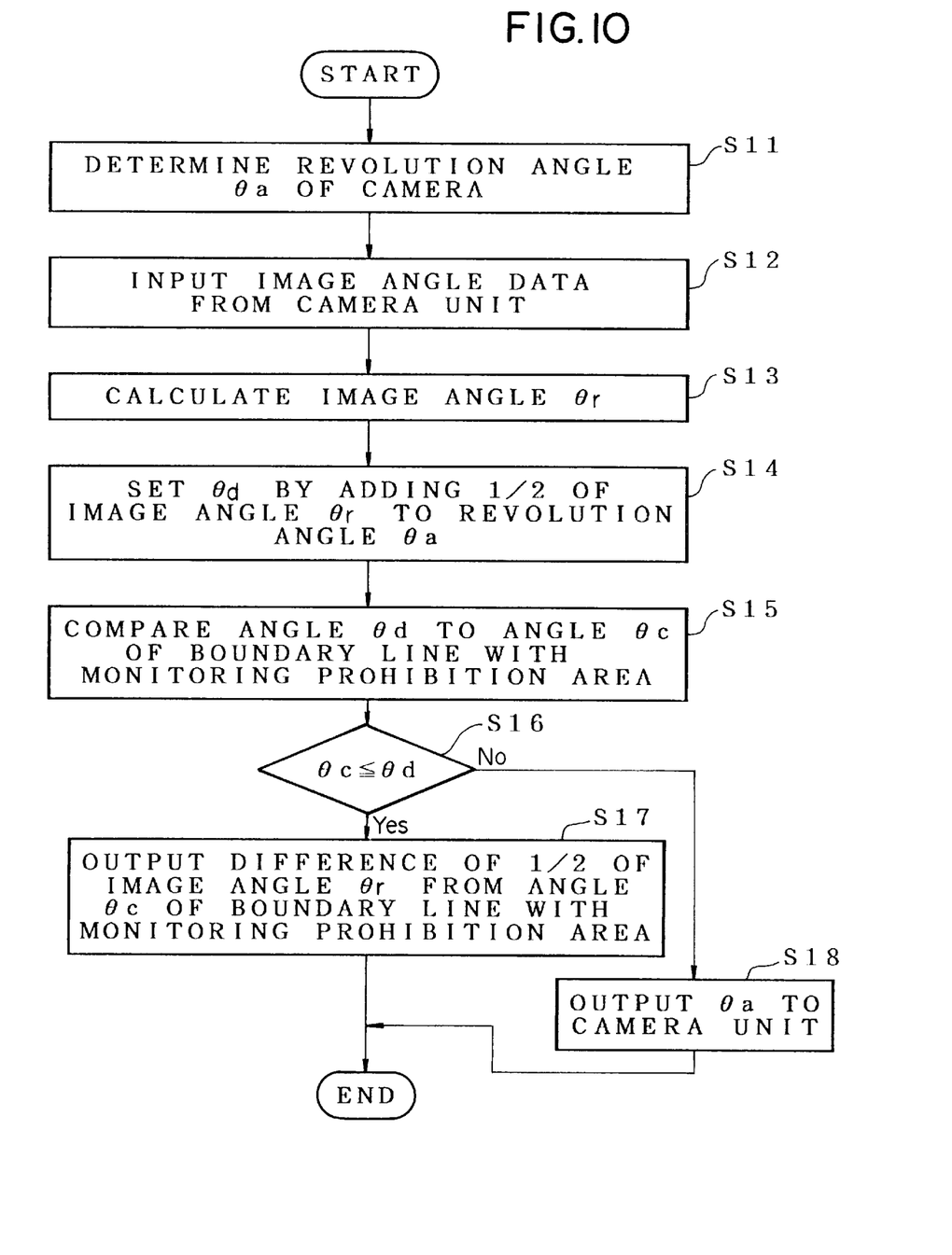
FIG. 10 is a flow chart illustrating a different embodiment of the invention.

Now, the operation according to the invention will be described with reference to flow charts. FIGS. 9 and 10 are flow charts illustrating an embodiment of the invention.

As described above, it is possible to display pictures from a plurality of cameras on the monitor screen 1a. It is also possible to display a plurality of monitoring area views in correspondence to such displayed pictures. That is, it is possible that a camera picture and a corresponding monitor area view 2 are displayed on each monitor screen 1a, and each camera can be controlled on each monitor screen 1a. For the sake of the brevity of description, a case will now be considered, in which a specific camera unit 5 is connected in one-to-one correspondence relation to the controller 3 and monitor 1.

The monitoring area view of the pertinent camera unit 5 is displayed on the monitor screen 1a of the monitor 1 (step S1).

An area shown by maximum and minimum values of X and Y coordinates in the monitoring area view is set to be an effective monitoring point designation area, a monitoring area view display area 2a (step S2).

Point A ($X_O$, $Y_O$) indicative of the pick-up position of of the actually installed camera unit 5, is designated in the monitoring area view display area 2a on the monitor screen 1a. The controller 3 stores this point and displays its symbol as camera origin A ($X_O$, $Y_O$) (step S3).

Point B ($X_H$, $Y_H$) Indicative of camera unit home position, i.e., the sight field direction of the actual camera unit 5, is designated as camera hole position B ($X_H$, $Y_H$) (step S4).

Line connecting the camera origin A ($X_O$, $Y_O$) and camera home position B ($X_H$, $Y_H$) is set as virtual line C which is expressed as 0°. An arrow indicative of the sight field direction, i.e., camera direction symbol, is displayed on the basis of the virtual line C (step S5).

A read signal is sent out to the camera unit 5, and angle data, i.e., actual home position data, is read out to be stored as absolute value home position data θy. As the home position data θy, the count of a servo motor encoder or pulse motor controller pulse counter of the camera unit 5 is output, that is, data about the number of pulses (i.e., degrees) of movement of the camera unit home position to the mechanical origin is output (step S6).

Using the point input unit 4, the position to which it is desired to move the camera unit sight line, i.e., monitoring point X ($X_X$, $Y_X$) is designated in the monitoring area display area 2a (step 7).

The controller 3 checks whether the coordinates ($X_X$, $Y_X$) of the monitoring point X ($X_X$, $Y_X$) are in a monitoring prohibition area. If it is determined that the coordinates are in the monitoring prohibition area, the subsequent operation is stopped, and an alarm is generated or likewise attention is invoked. Alternately, the revolution angle is corrected as will be described later (step S8).

If is not determined that the coordinates are in the monitoring prohibition area, a monitoring point angle θa, which is defined by line passing through the camera origin A ($X_O$, $Y_O$) and the monitoring point X ($X_X$, $Y_X$) and the virtual Line C passing through the camera origin A ($X_O$, $Y_O$), is calculated and set as angle of revolution of the camera unit 5, i.e., relative angle (step S9).

Since the monitoring point angle θa is the relative angle difference with respect to the camera unit home position (0°) and monitoring point X ($X_X$, $Y_X$), it is sent out directly, or alternatively an absolute value angle data control signal is obtained from the absolute value home position data θy obtained in the step S6 and sent out to the camera unit 5 (step S10).

In the above way, the revolution data indicative of the position designated on the monitor screen 1a is sent out to the camera unit 5. As a result, the pulse motor or servo motor in the camera unit 5 is moved to designated data extent to designated direction, so that the sight line of the camera unit is directed to the designated direction.

Figure 3:
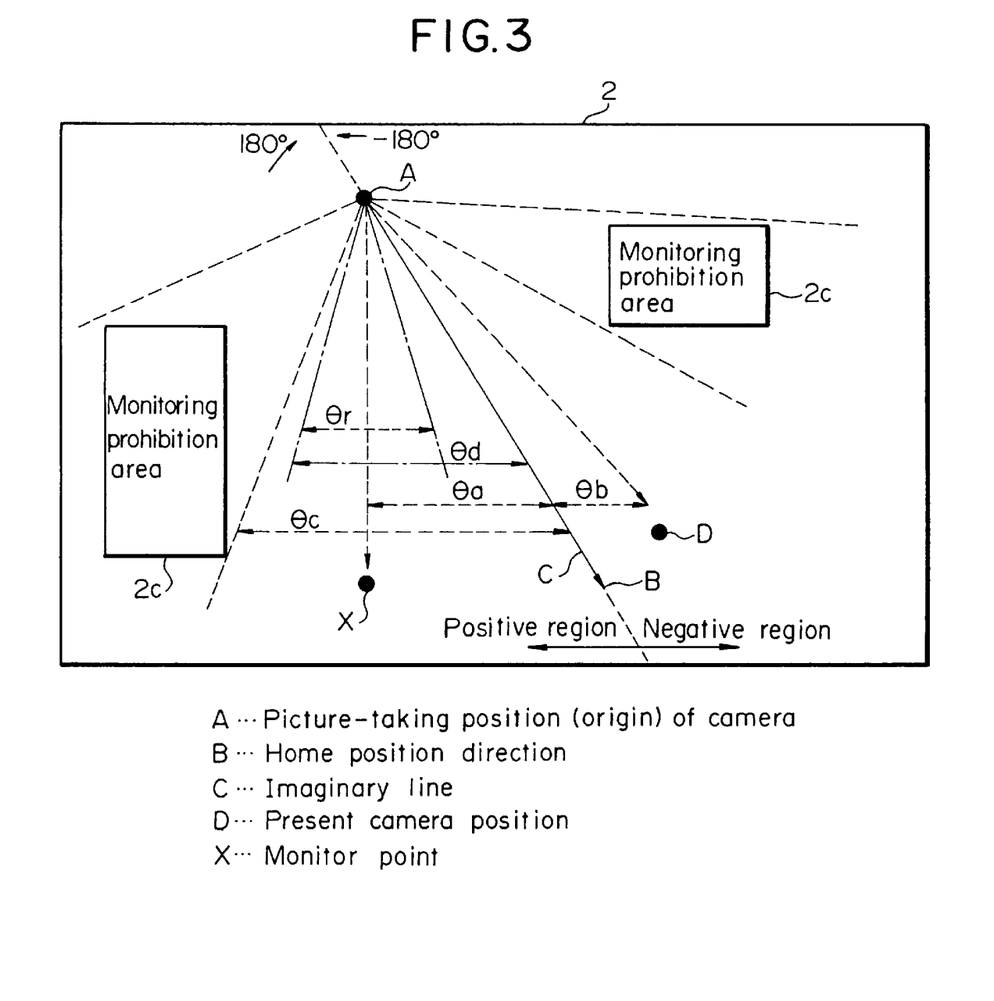
FIG. 3 is a view showing an example of the position relation of the pick-up position of camera (origin) to home position, monitoring point and monitoring prohibition area.

Now, an operation in case when the vicinity of the monitoring prohibition area is designated as monitoring point will be described with reference to the drawings. FIG. 10 is a flow chart illustrating a different embodiment of the invention. FIG. 3 is a view showing the position relation of the origin A of the camera unit 5, home position direction B, virtual line C, monitoring point X and monitoring prohibition area 2c to one another.

Figure 4:
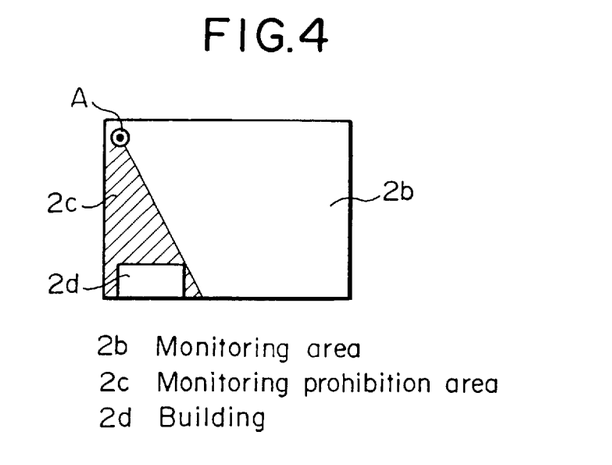
FIG. 4 is a view showing a state in which a monitoring prohibition area is designated in a monitoring area.

Here, a case as shown in FIG. 4 is considered, in which a monitoring prohibition area 2c is designated to exclude a building 2d in the monitoring area view display area 2a from the picture.

Figure 5:
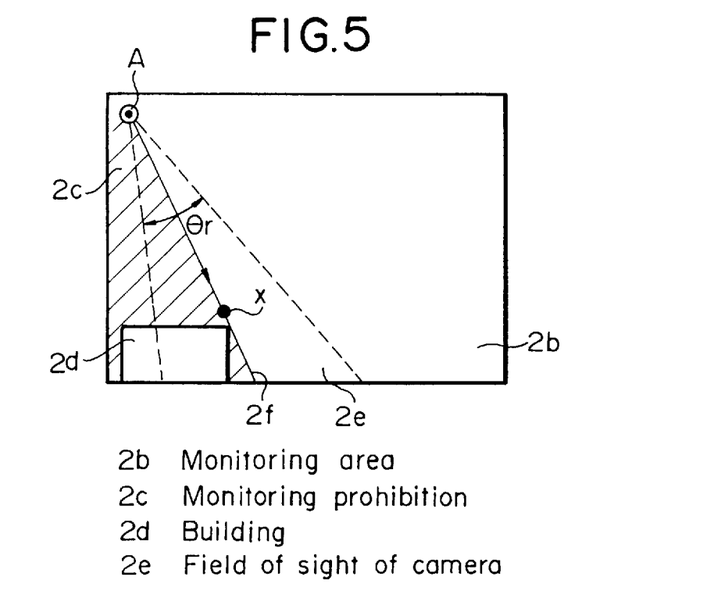
FIG. 5 is a view showing a state in which a monitoring pint is designated near the boundary line of the monitoring prohibition area.
Figure 6:
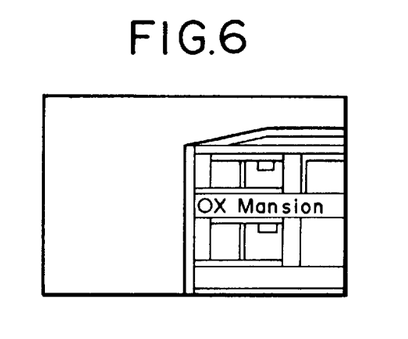
FIG. 6 is a view showing a picture obtained in the state shown in FIG. 5.
Figure 7:
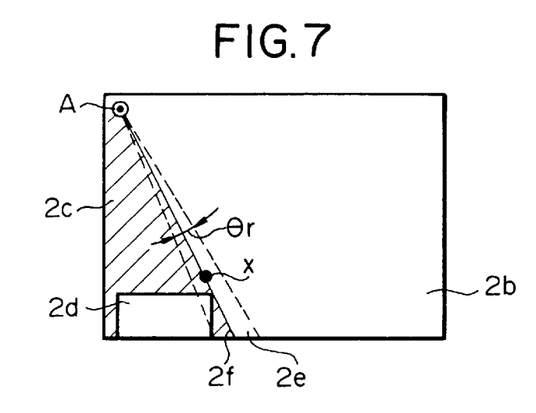
FIG. 7 is a view showing a state of zooming brought about by reducing the picture angle from the FIG. 4 state with the monitoring point designated near the boundary line of the monitoring prohibition area.
Figure 8:
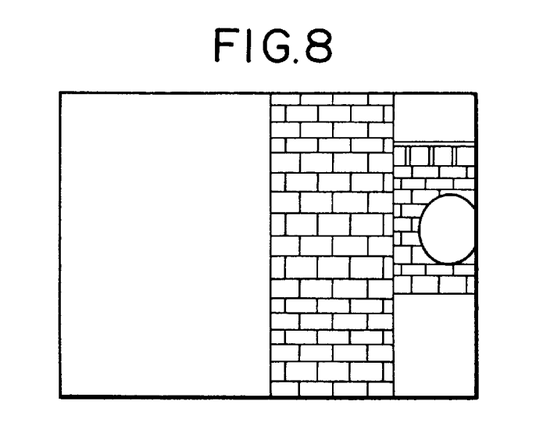
FIG. 8 is a view showing a picture obtained in the FIG. 7 state.

As shown in FIGS. 4 and 5, if a monitoring pint X is designated in the vicinity of the boundary of the monitoring prohibition area 2c, causing revolution of the camera unit 5 by directly calculating the angle data control signal as noted above results in that the building 2d is contained in the picture because the sight field 2e is a range expressed by the picture angle θr. The picture at this time is shown in FIG. 6. While the picture angle θr is changed by designating the monitoring point X as shown in FIG. 7, in this case the building 2d is included in the sight field of the camera. In this case, the picture is as shown in FIG. 8.

It will be seen that when the monitoring point X is designated in the vicinity of the monitoring prohibition area 2c, therefore, it is necessary to exclude the monitoring prohibition area 2c from the camera sight field 2c by some or other means.

Here, the same routine as in that in FIG. 9 is executed up to the step S8 in the same Figure. Then, again revolution angle data indicative of the monitoring point angle, i.e., the relative angle θa (step S11).

Then, the present picture angle data is read out by sending out a read signal to the camera unit 5 (step S12). From this picture angle data the picture angle θr is obtained (step S13).

One half the picture angle θr is added to the monitoring point angle, i.e., relative angle θa, noted above, thus obtaining angle θd (step S14).

Then, the angle of the boundary with the monitoring prohibition area 2c and the angle θd obtained in the step S14 are compared (step S15).

If the angle θd is equal to or greater than the boundary angle, the difference between the monitoring point angle, i.e., relative angle θa and one half the picture angle θr, is sent out as data of the revolution angle, i.e., corrected revolution angle θe to the camera unit 5 (step S16, S17).

Otherwise, the revolution angle data, i.e., relative angle data θa, is sent out to the camera unit 5 (step S16, S18).

In the above way, even when a monitoring point is set in the vicinity of the boundary with the monitoring prohibition area 2c, it is possible to exclude the monitoring prohibition area 2c from the sight field 2e of the camera unit 5, i.e., from the camera picture.

Further, in case when a new monitoring point X is designated after movement of the camera unit sight line to the direction of the monitoring point that has previously been designated, a check is made as to whether the present camera position D is in the positive or negative area with respect to the virtual Line C of the home position B of the camera, and the relative angle is obtained as the corrected revolution angle θe by adding or subtracting the angle θb defined by the present camera position and the virtual line to or from the monitoring point angle θa.

Further, in cases when there are a plurality of monitoring prohibition areas 2c or when a new monitoring point X is designated by exceeding the monitoring prohibition area 2e, a check is made as to whether the angle θa is in the upper or lower half of the usual area or monitoring prohibition area 2c.

As has been described in the foregoing, according to the invention the direction control of the camera unit is possible by designating the monitoring position on the drawing of camera unit installation cite on the monitor screen, thus simplifying the operation, requiring less operator's eyesight movement, causing less fatigue and eliminating operation errors. Further, it is made possible to connect a large number of cameras with a small-size and easily operable system.

Further, with the designation of monitoring point in the monitoring prohibition area or the vicinity thereof, the camera unit is caused to undergo no revolution or revolution by such an angle that no monitoring prohibition area is in the camera picture. Thus, it is possible to ensure reliable privacy protection. Further, checking as to whether a picture can be monitored permits saving of the time of operating the camera unit, thus improving the operation control property.

What is claimed is:

1. A method of camera control with monitoring area view comprising the steps of:

displaying a monitoring area view in which an installation position of a camera unit, a home position of the camera unit, a pick-up subject, and a sight field direction of the camera unit is displayed on a portion of a monitor screen for displaying an image picked up by the camera unit;

inputting a point on the monitoring area view with a point input unit, the point being the installation position of the camera unit as an origin;

inputting a home point indicative of a home position direction of the camera unit with the point input unit;

setting a line defined by the installation position of the camera unit and the home position direction thereof to be a virtual line (0°);

inputting a monitoring point on the monitoring area view with the point input unit;

obtaining a monitoring point angle θa, which is defined as an angle between a line passing through a designated monitoring point and the origin, and the virtual line (0°);

causing revolution of the camera unit by an amount equal to the monitoring point angle θa;

establishing a monitoring prohibition area to be excluded from the image picked up by the camera unit;

limiting the monitoring point angle θa to exclude the monitoring prohibition area from the camera image;

reading out present camera picture angle data θr from the camera unit;

obtaining an angle θd by adding one half the camera picture angle θr to the monitoring point angle θa; and sending out the data of the monitoring point angle θa to the camera unit when the angle θd is below an angle θc of a boundary with the monitoring prohibition area while sending out an angle obtained as a result of subtraction of the one half the camera picture angle θr from the boundary angle θc as corrected monitoring point angle θa' to the camera unit when the angle θd is above the angle θc of the boundary with the monitoring prohibition area.

2. The method of camera control with monitoring area view according to claim 1, further comprising the steps of:

designating a next monitoring point of the camera unit;

obtaining a relative angle θe by adding the monitoring point angle θa to a next monitoring point angle θb; and sending the relative angle θe out to the camera unit.

3. The method of camera control with monitoring area view according to claim 1, further comprising the steps of:

designating a next monitoring point of the camera unit;

obtaining a relative angle θe by subtracting the monitoring point angle θa from a next monitoring point angle θb; and sending the relative angle θe out to the camera unit.

4. A system for camera control with monitoring area view comprising:

a camera unit capable of being revolved vertically and horizontally according to a predetermined control signal, and of converting a video input signal into a picture signal;

a monitor having a monitor screen for displaying the picture signal from the camera unit;

a point input unit for designating a desired point on the monitor screen; and a controller connected to the camera unit, the monitor, and the point input unit, wherein the controller includes:

drawing display means for displaying a monitoring area view on the monitor screen;

input means for obtaining, from the point input unit, an installation position of the camera unit as origin thereof, a home point indicative of a home position of the camera unit, and a monitoring point on the monitoring area view;

monitoring point angle calculating means for setting a line defined by the origin and the home position direction to be a virtual line (0°), and for obtaining a monitoring point angle $\theta a$, which is defined as an angle between a line passing through the designated monitoring point and the origin, and the virtual line (0°);

picture angle data input means for reading out present camera picture angle data $\theta r$ from the camera unit;

angle calculating means for obtaining an angle $\theta d$ by adding one half the camera picture angle data $\theta r$ obtained from the picture angle data input means to the monitoring point angle $\theta a$;

comparing means for comparing the angle $\theta d$ obtained by the angle calculating means and an angle $\theta c$ of a boundary with a monitoring prohibition area;

corrected monitoring point angle calculating means for obtaining a corrected monitoring point angle $\theta a'$, by subtracting one half the camera picture angle $\theta r$ from the boundary angle $\theta c$ when the angle $\theta d$ is above the boundary angle $\theta c$; and revolution angle data generating means for sending out the monitoring point angle $\theta a$ and the corrected monitoring point angle $\theta a'$ as revolution angle data DA to the camera unit.

* * * * *

UNITED STATES PATENT AND TRADEMARK OFFICE
CERTIFICATE OF CORRECTION

PATENT NO. : 5,808,670
DATED : September 15, 1998
INVENTOR(S) : Masahiko Oyashiki, et al.

It is certified that error appears in the above-identified patent and that said Letters Patent is hereby corrected as shown below:

Column 2, Line 63 (as counted), should read as follows: "unit 5 and a monitoring point X on the monitoring area"

Column 6, Line 25 should read as follows: "area 2a (step S7)."

Column 10, Line 12, should read as follows: "obtaining a corrected monitoring point angle θa' by"

On the title page of the Patent, in the text under the drawing figure, "A" should read as follows: "Installation position (origin) of camera". "D" should read as follows: "Next monitor point".

In Figure 1 of the Drawing Sheets, in the text under the figure, "A" should read as follows: "Installation position of camera". "B" should read as follows: "Home point". The following line of text should be added: "X  Monitor point"

In Figure 3 of the Drawing Sheets, in the text under the figure, "A" should read as follows: "Installation position (origin) of camera". "D" should read as follows: "Next monitor point"

UNITED STATES PATENT AND TRADEMARK OFFICE
CERTIFICATE OF CORRECTION

PATENT NO. : 5,808,670
DATED : September 15, 1998
INVENTOR(S) : Masahiko Oyashiki, et al.

It is certified that error appears in the above-identified patent and that said Letters Patent is hereby corrected as shown below:

In Figure 5 of the Drawing Sheets, in the text under the figure, "2c" should read "Monitoring prohibition area".

In Figure 9 of the Drawing Sheets, in the box indicated as "S4", the third line of text should read as follows: "POSITION ($X_H \cdot Y_H$) OF CAMERA".

In Figure 9 of the Drawing Sheets, in the box indicated as "S8", the word "ARIA" should read "AREA".

Signed and Sealed this

Ninth Day of February, 1999

Attest:

*Attesting Officer*

*Acting Commissioner of Patents and Trademarks*